INVENTORS.
ANGELO R. DE VITO
OTTO V. PUZIK
ATTORNEYS.

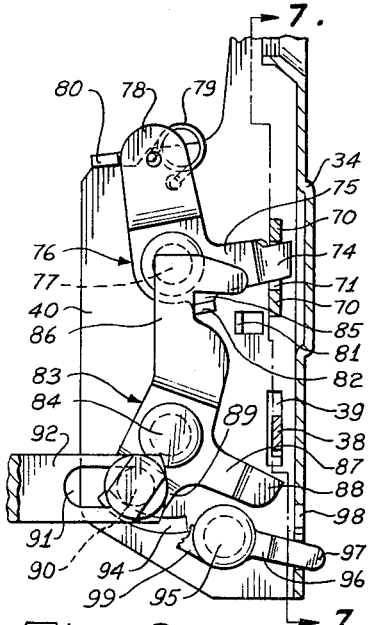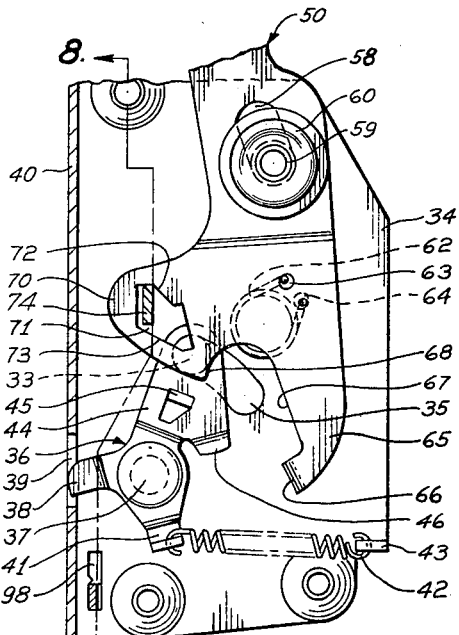

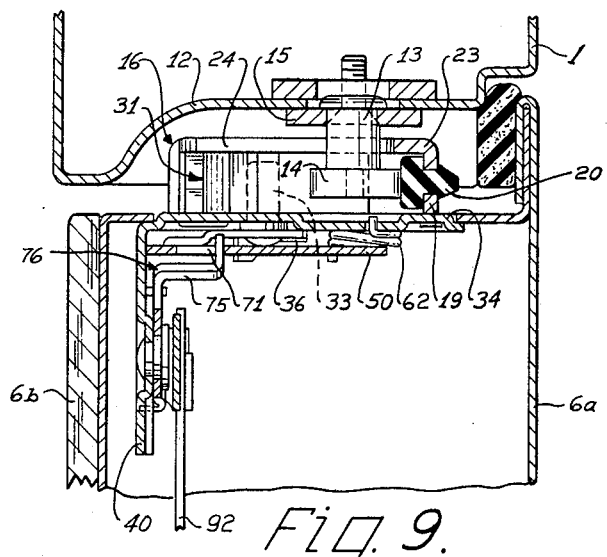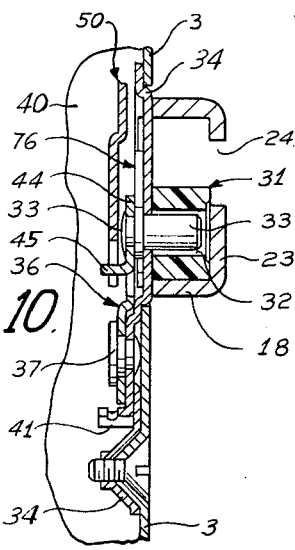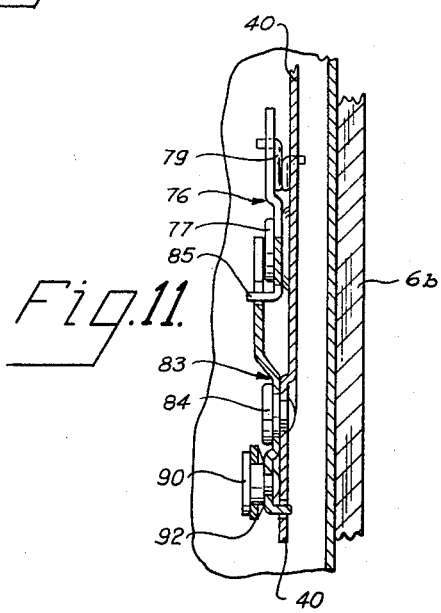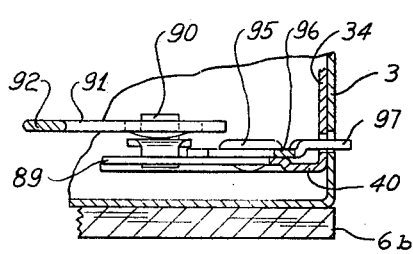

United States Patent Office 3,507,530
Patented Apr. 21, 1970

3,507,530
LATCH MECHANISM
Angelo R. De Vito, 1354 S. Belvoir Blvd., South Euclid, Ohio 44121, and Otto V. Puzik, 5600 Clairidge Drive, Willoughby, Ohio 44094
Filed Apr. 27, 1967, Ser. No. 634,271
Int. Cl. E05c 1/12
U.S. Cl. 292—173
15 Claims

ABSTRACT OF THE DISCLOSURE

An automobile door latching mechanism with optional provisions for keyless locking, freewheeling and child safety characterized, among other things, by a slidable one-piece contactor that is movable between a working position and an idling position in at least one of which positions it is capable of pivotal deflection; a plurality of levers of the bell-crank type one or more of which can initiate sliding movement of the contactor between working and idling positions; and pin-and-slot connections between one of said levers and a wedge-like latch element adapted to cooperate with an externally mounted striker.

BACKGROUND OF THE INVENTION

Automobile door latching systems, in their relation to accident-induced and other unintended automobile door openings, have been the subject of intensive study and recommendations by the Auto Crash Group at the University of California (Los Angeles). Findings of the group have been reported, inter alia, in S.A.E. Transactions, vol. 67, 1959, 238–262; in S.A.E. Journal, S.P. 174; and in Paper No. 817A, entitled "Accidental Motorist Ejection and Door Latching Systems," presented by Arthur G. Gross, Engineering Research Consultant to the Institute of Transportation and Engineering, at the Automotive Engineering Congress held in Detroit, Michigan, Jan. 13–17, 1964. The present invention has as its principal objects to provide door latching systems conforming to standards and recommendations therein outlined.

Prior art

The prior art is exemplified, among others, by U.S. Patents Nos. 2,183,672 and 2,274,362 to W. C. Devereaux, No. 2,196,477 to E. G. Simpson, No. 2,230,409 to S. B. McKenzie, No. 2,674,483 to A. R. De Vito, and British Patent No. 970,538 to Pickard.

BRIEF DESCRIPTION OF THE DRAWINGS

In the accompanying drawings, which show the preferred embodiment of the invention and several typical modifications of such preferred embodiment.

FIGURES 5 and 6 are simplified views corresponding to FIGURES 3 and 4, respectively, showing the parts as they appear with the child safety lever in operation and the contactor urged inward by a push button plunger;

FIGURES 7 and 8 are simplified views corresponding to FIGURES 5 and 6 but with the parts in their locked positions;

FIGURE 9 is a section looking down from a horizontal plane passing through line 9—9 of FIGURE 4, the parts being shown in their locked positions;

FIGURE 10 is a section on line 10—10 of FIGURE 3;

FIGURES 11 and 12 are sections on lines 11—11 and 12—12 of FIGURE 4;

PREFERRED EMBODIMENTS

Preferred embodiments of the invention are shown in FIGURES 1 to 16, 19 and 20; representative modifications are illustrated in FIGURES 17, 18, 21 and 22.

Figure 1:
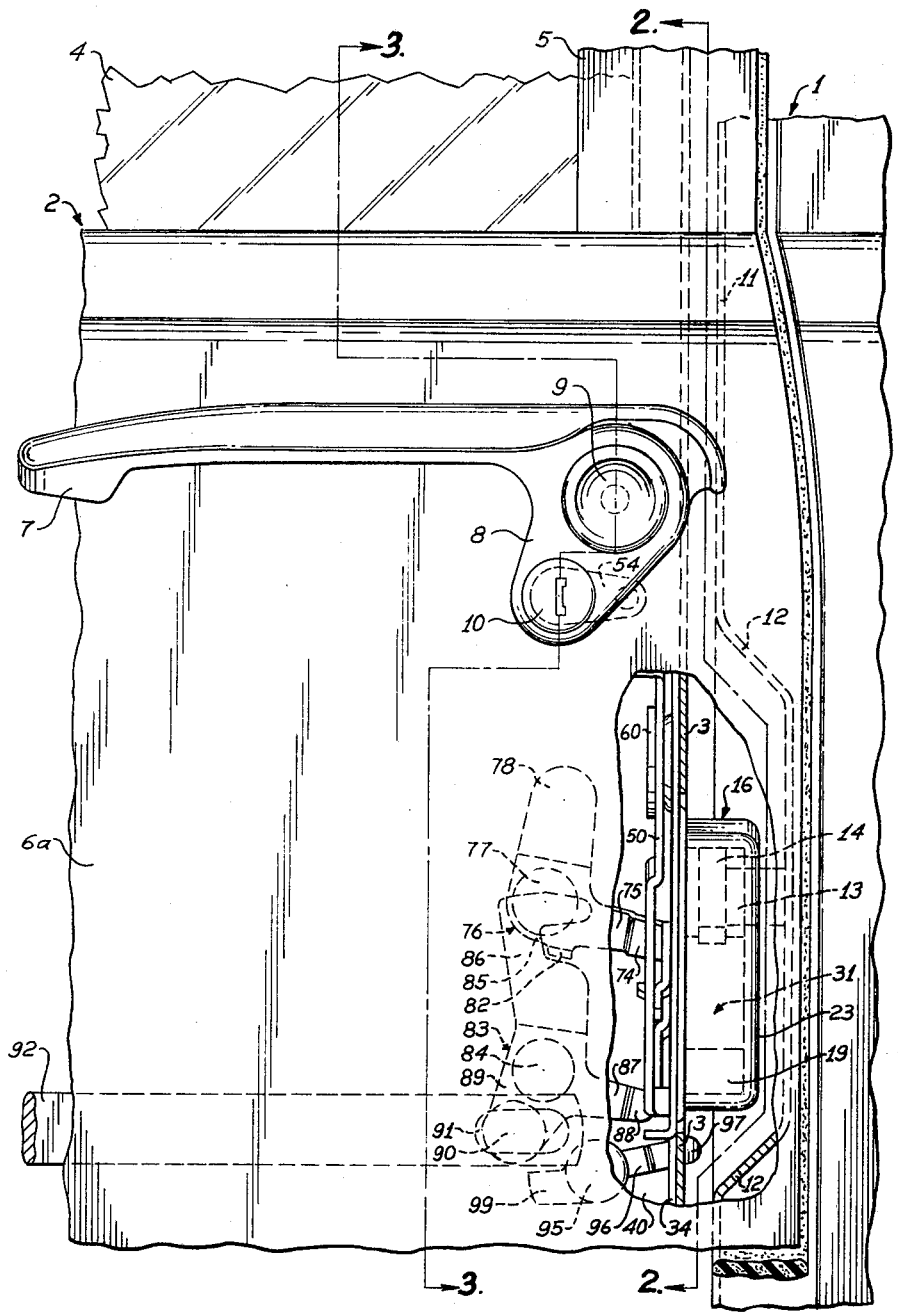
FIGURE 1 is a fragmentary side elevation of the exterior of a closed, latched, unlocked left front door of an automobile wherein the latch mechanism of the present invention is incorporated.
Figure 2:
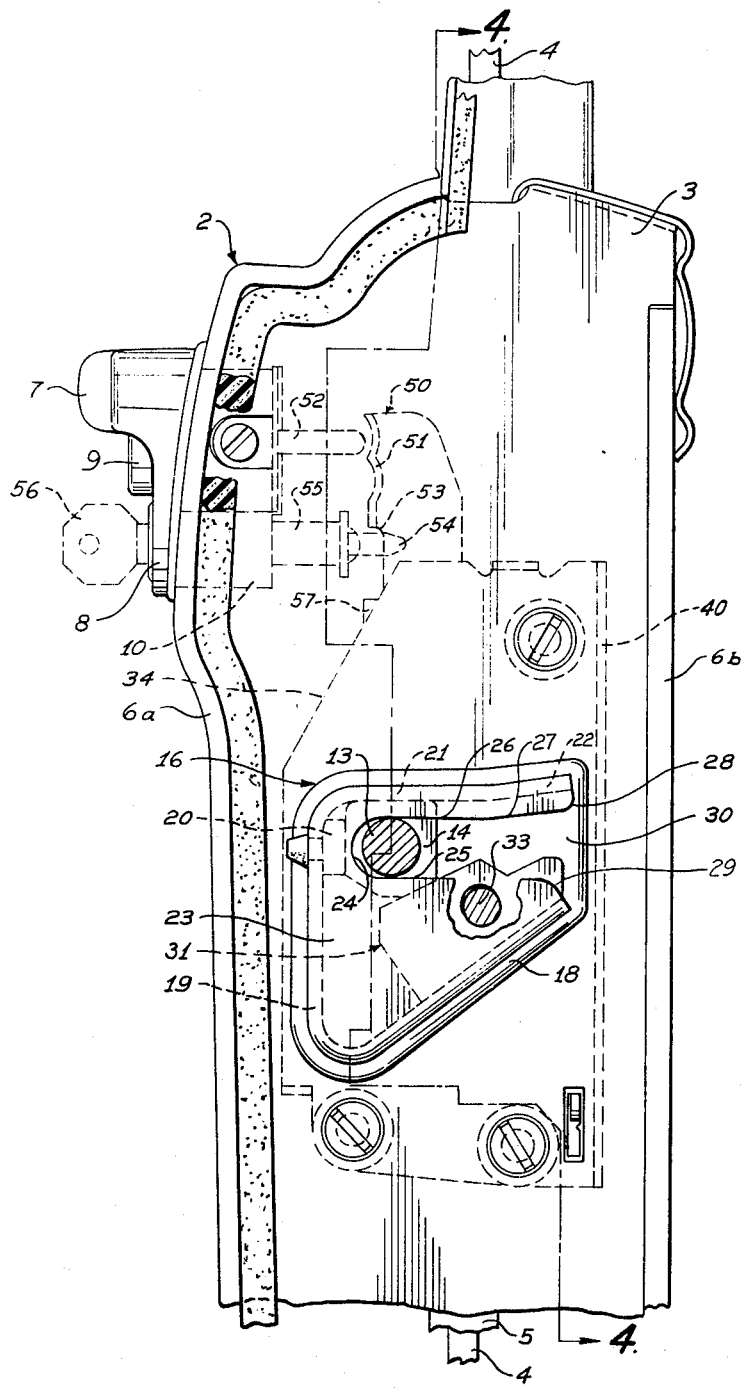
FIGURE 2 is a corresponding end elevation with parts broken away, seen as if from line 2—2 of FIGURE 1.
Figure 3:
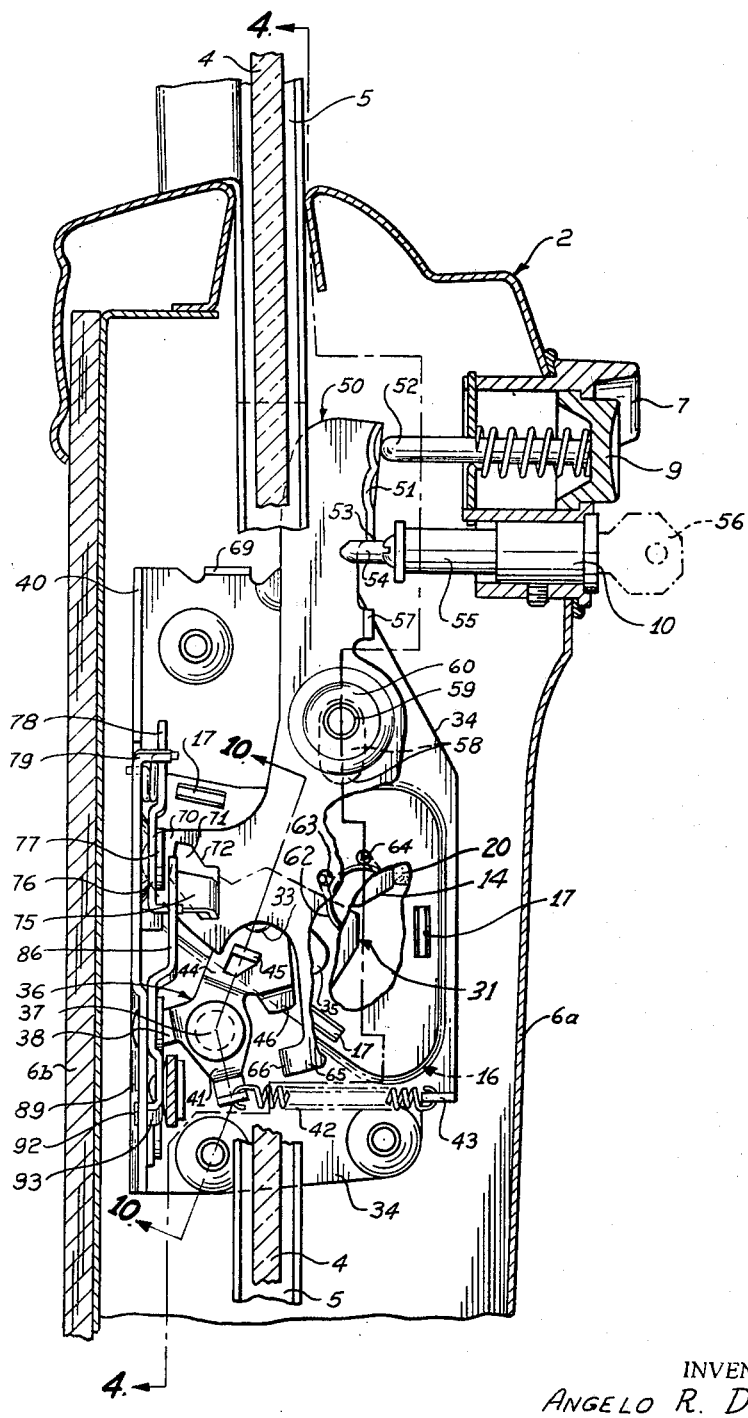
FIGURE 3 is a vertical section, but with parts broken away, seen as if from line 3—3 of FIGURE 1; i.e., looking toward the zone of cleavage between the door and the corner of the body in which the body pillar is incorporated.
Figure 4:
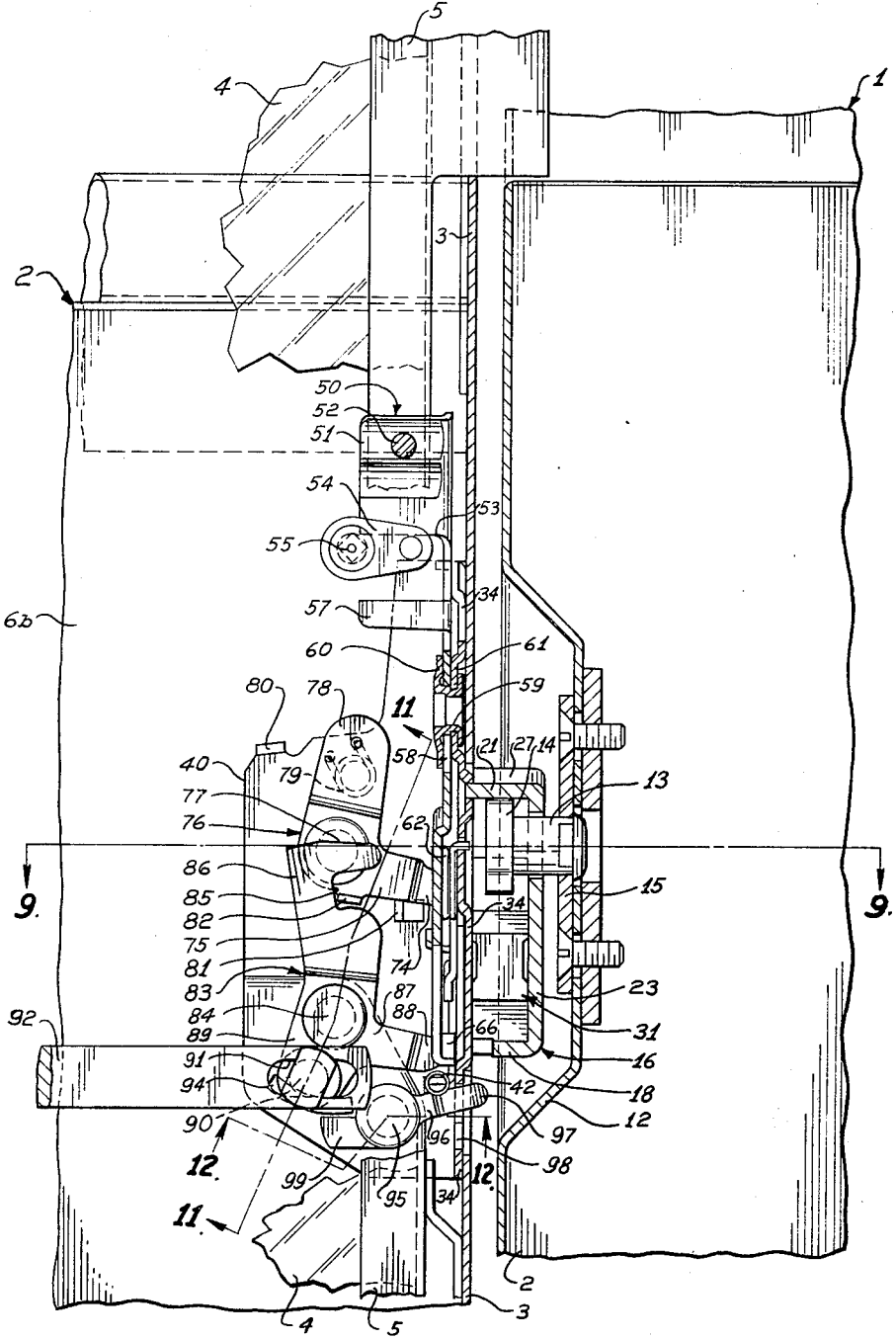
FIGURE 4 is a vertical section with the window glass largely broken away, seen as if from line 4—4 of FIGURE 3, both the body and the door being shown in the figure.

In FIGURES 1 to 4, reference character 1 refers generally to the portion of an automobile body located immediately adjacent one of the door openings, which portion commonly includes a body pillar; reference character 2 refers generally to the door itself, for convenience shown as the left front door of the automobile. The free end face of door 2, designated 3, is seen in FIGURES 2 and 4, the latter of which shows the cleavage zone between body portion 1 and end face 3. The usual window glass 4, operating in glass run channels 5, may be seen in each of FIGURES 1 to 4, but most clearly in FIGURE 3. In the case of door 2, the outside and inside panels are respectively indicated by reference characters 6a and 6b.

Mounted in conventional fashion on door 2 is a fixed door handle 7 with a downwardly reaching extension 8. Incorporated in extension 8 is a conventional push-button assembly 9 (FIGURES 1 and 3). The latter is of a type wherein the push button is biased toward an easily accessible outer position from which it can be urged inwardly by application of the thumb. Below the push-button assembly 9 is a cylinder lock 10, likewise conventional in location and construction.

In the cleavage zone between body portion 1 and door 2, metal door frame 11 on body portion 1 is recessed inwardly in the manner indicated in dotted lines in FIGURE 1 and in solid lines in FIGURE 4. Within recessed portion 12 is a massive stud 13 provided with what is essentially a pentagonal head 14. Stud 13 and head 14 together constitute a striker which at its supported or inner end is firmly secured to a plate 15. The plate itself is attached, as by screws, to body portion 1. Striker stud 13 and head 14 are adapted to coact with certain components on door 2, among them a latch housing 16 held by fastening elements 17 (FIGURE 3) to end face 3 of door 2. From end face 3 latch housing 16 projects into the cleavage zone between door 2 and door frame 11.

It will be observed from FIGURE 2 that latch housing 16 is provided, in the form there depicted, with an inclined bottom wall 18, a vertical end wall 19 in which is supported a resilient bumper 20, a horizontal top wall 21 with a slightly angled outer end 22, and a slotted face 23 which connects walls 18 and 19. In face 23 is a laterally directed slot 24 characterized by a rounded inner end, a horizontal lower edge 25, a horizontal upper edge 26, and, extending from the latter, an angled edge portion 27 corresponding to angled outer end 22 on horizontal top wall 21.

It will be seen from FIGURE 2 that angled end portion 27 has a contoured outer corner 28. An oppositely contoured corner 29 is formed at the junction of bottom wall 18 and lower edge 25 of slot 24. Between corners 28 and 29, slot 24 has a mouth 30 that is considerably broader than that portion of slot 24 which lies inwardly of angled end portion 27; i.e., to the left thereof as seen in FIGURE 2. From a comparison of FIGURE 2 with FIGURES 13 to 16 it will be evident that mouth 30 is designed to embrace striker stud 13. Thus when door 2 closes against door frame 11, slot 24 in latch housing 16, accepts striker stud 13 in a manner such as to guide housing 16, and therefore door 2, as the latter moves into closed position. This action obviates the need, in order to assure proper door alignment, for providing upper and lower dovetail elements such as are present in the door frames of many conventional automobiles.

Contained and confined within latch housing 16 is a spring-loaded latching wedge 31 of polygonal shape the bottom face of which rides on inclined bottom wall 18 of latch housing 16. It will be observed from FIGURES 13 to 16 that latch element 31 tapers slightly in a plurality of stages, a configuration that tends to give it its wedge-like appearance. This and other features of latch element 31 make possible early latching by and subsequent chocking of striker head 14.

Figure 13:
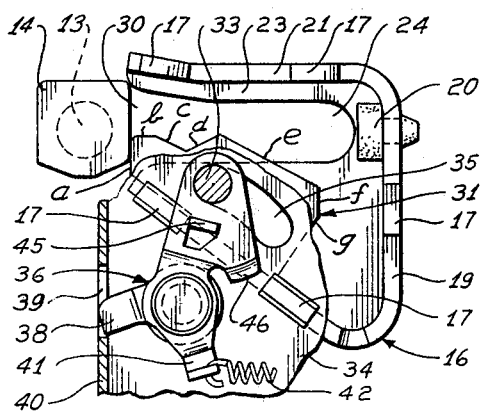
FIGURES 13 to 16 are simplified views showing sequentially the positions assumed in relation to the striker by the wedge and wedge housing as the door is closed.
Figure 14:
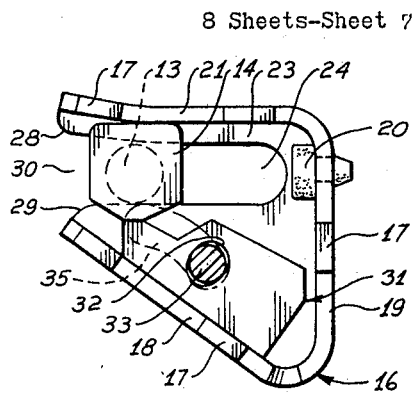

In addition to its bottom face, latch element 31 has seven other faces designated $a$ to $g$ in FIGURE 13. These face designations are not repeated in FIGURES 14 and 15; however, it will be noted that striker head 14 is in engagement with face $a$ in FIGURE 13. In FIGURE 14 it is in engagement with face $b$. Comparison will show that these two faces figure in and bring about the downward retrogression or retreat of latch element 31. Such retreat is occasioned by closing movement of door 2 and consequent movement of latch housing 16 out of the position shown in FIGURE 13 into that shown in FIGURE 14, wherein face $f$ adjoins, but does not abut, end wall 19 of latch housing 16.

Figure 15:
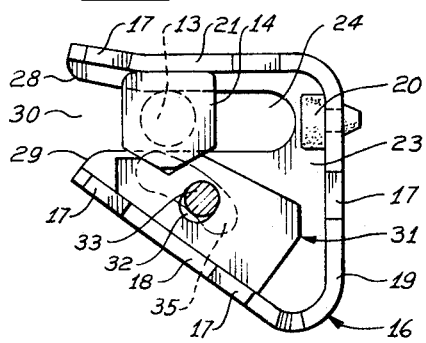

In FIGURE 15 is represented a condition of a kind commonly known as "early latching"; viz, one in which the parts tend to persist in position until such time as further closing movement of door 2 forces latch housing 16 farther to the left in relation to striker stud 13.

Figure 16:
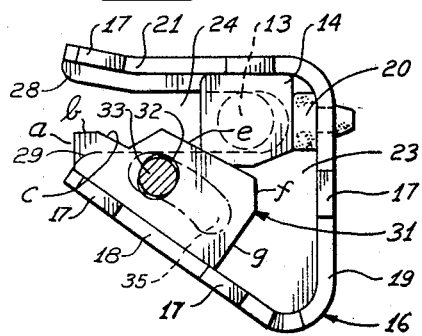

FIGURES 15 and 16 help make clear what happens incident to return of latch element 31 to its original position. The former shows striker head 14 as contacting faces $c$ and $d$ of latch element 31; the latter, as contacting face $e$. Before moving into the position illustrated in FIGURE 16, in which there is chocking engagement between face $e$ on latch element 31 and striker head 14, the latch element first moves rearward into an intermediate position analogous to that represented in FIGURE 14. Thereafter, it moves forward again into the position shown in FIGURE 16. As the door closing movement nears completion, striker head 14 engages bumper 20: see FIGURES 9 and 16. This engagement is characteristic of the full-latched position (and therefore of locked position) of the mechanism as a whole.

Examination of FIGURES 13 to 16 will show that faces $c$ and $e$ on latch element 31 taper from right to left at the same rate; i.e., at the same angle relative to bottom wall 18 of latch housing 16. The angle of taper is such as to confrom to one of the two angled surfaces on striker head 14; viz, the one to the left of face $a$ in FIGURE 14. Intersecting face $d$, which forms a shoulder between faces $c$ and $e$, is so inclined in relation to them as to conform to the other of the two angled surfaces on striker head 14.

The early-latch state illustrated in FIGURE 15 involves joint cooperation of each of faces $c$ and $d$ with striker head 14. The full-latched state illustrated in FIGURE 16 involves only face $e$. Nevertheless, because of the taper characterizing face $e$, striker head 14 and latch element 31 are firmly engaged, the latter as a result of the influence of the return spring hereinafter described by which latch element 31 is urged from right to left throughout the entire sequence of steps illustrated in FIGURES 13 to 16, inclusive.

The inclusion in latch element 31 of a slightly elongated transverse opening 32 (FIGURES 10 and 14 to 16) and the presence therein of a pin 33 that passes through latch plate 34 and projects thence into opening 32 makes possible a limited but desirable degree of relative movement between them. Note that in FIGURES 14 and 16 opening 32 appears above pin 33 whereas in FIGURE 15 it appears below pin 33: pin 33 moves from one position to the other in response to requirements imposed on it by parts of the mechanism located on the opposite side of latch plate 34. On the other hand, as between latch element 31 and striker head 14, the nature and extent of the movement tends to depend more on the shape, taper and other characteristics of faces $c$, $d$ and $e$.

Figure 17:
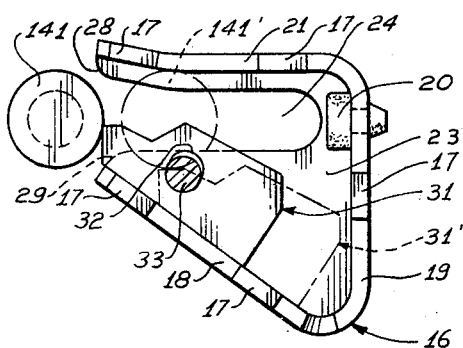
FIGURES 17 and 18 are views respectively similar to those of FIGURES 13 and 15 showing the use of a striker of circular shape.
Figure 18:
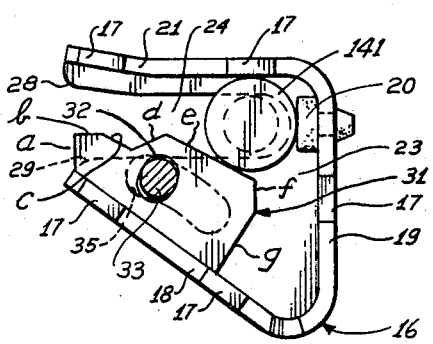

FIGURES 17 and 18 show a modification in which a circular striker head 141 is used in lieu of pentagonal head 14. The action is substantially the same; e.g., as latch housing 16 moves from right to left in relation to the striker, contoured surfaces 28 and 29 at the mouth of slot 24 guide the parts into the position indicated by dotted lines 141' in FIGURE 17, which corresponds to FIGURE 14. Subsequently latch element 31 moves as already explained through several intermediate positions into the position shown in FIGURE 18. Striker head 141 comes into engagement with resilient bumper 20 after the door moves out of its early-latch position into fully latch position (FIGURE 18).

If desired, latch element 31 may be of metal but preferably it is of a tough, hard, durable, wear-resistant synthetic resin such as nylon ("Zytel").

As previously noted, pin 33 passes through latch plate 34 and thence into transverse slot 32 in latch element 31. To this end, there must be a suitable opening in latch plate 34, one large enough to permit pin 33 to move latch element 31 in latch housing 16 within the limits indicated in FIGURES 13 and 14. In the preferred embodiments of the invention, this opening takes the form of an arcuate slot 35: see, for instance, FIGURES 3, 7 and 13. At its inner end, best seen in FIGURE 10, pin 33 is preferably rigidly mounted on some suitable supporting element. This may to advantage be one of the arms of a release lever of the bell-crank type; for example, lever 36 (FIGURES 5 and 7).

Release lever 36 is movably mounted on latch plate 34 by means of a pivot pin 37. It is guided and limited in its pivotal movement by a laterally extending arm 38 and by a cooperating slot 39 in latch flange 40: see FIGURE 7. To a second arm 41, directed downward, is attached a coil spring 42 that is coupled at its opposite end to an anchor 43 on latch plate 34. Spring 42, seen as in FIGURE 7, is not tensioned to any material extent. When tensioned (FIGURE 5), it exerts a force on arm 41 that tends to bias release lever 36 in a counterclockwise direction. On upwardly directed arm 44 of release lever 36, which is the one on which pin 33 is mounted, are a tab or first stop 45 and, spaced therefrom, a second stop 46 of somewhat different shape. These two stops play a part in the operation of contactor 50, which will next be described.

Contactor 50, which is of one-piece construction and the largest movable element in the latch mechanism, is best seen in FIGURES 3 and 5. It should be brought out at this point that contactor 50 has two distinct types of movement, a sliding movement that carries it from one to the other of an upper non-operating position and a lower or operating position. It is only when the contactor is in its non-operating position that the latch mechanism as a whole can be locked. However, in both positions contactor 50 can move clockwise and counterclockwise with its extremities describing arcuate paths. In each of FIGURES 3 and 5, contactor 50 is shown at the lower end of its sliding movement, in one case at one limit of its pivotal movement and in the other case at the opposite limit.

Pivotal movement of the contactor may be brought about in several ways, one of which makes use of a horizontally ridged two-section flange 51 located at the upper end of the contactor: compare FIGURES 3 and 4. With the parts in the position shown in FIGURE 3 (i.e., with door 2 closed and latched but not locked) plunger 52, which forms part of push-button assembly 9, can be urged against the upper section of flange 51 by the pressure of the thumb on the push button. The resulting counter clockwise movement of contactor 50 brings it into the position shown in FIGURE 5, which is maintained as long as pressure is exerted on flange 51 by plunger 52.

Through the intervention of release lever 36 and certain elements yet to be described, this counterclockwise movement causes latch element 31 to retreat from the position shown in FIGURE 16, releasing the striker and unlatching the mechanism as a whole. When, however, contactor 50 is in its upper position (illustrated in FIGURES 7 and 22), the counterclockwise movement initiated by plunger 52 is without material effect on the other parts of the latch mechanism. The contactor merely moves temporarily into the deflected position shown in FIGURE 7, from which it returns when the pressure of the plunger 52 is removed. This is movement of the so-called "freewheeling" type and is a desirable rather than a necessary feature of the invention.

Contactor 50 may be urged between upper and lower positions in more than one way. The simplest is upward movement initiated by the application of upward pressure against the lower edge of flange 51 by a crank 54 attached to cylinder extension 55 forming part of lock 10. Assuming that key 56 is turned in the proper direction, the lock cylinder extension will rotate through an arc of roughly 90° in a manner such as to cause crank 54 to bear against flange 51 and thus force contactor 50 out of its lower or working position (FIGURE 3) into its upper or idling position (FIGURE 7).

With contactor 50 in its upper or idling position, as in FIGURE 7, it can be returned to its lower or working position by moving key 56, cylinder extension 55 and crank 54 in the opposite direction. This causes crank 54 to engage a second flange 57 on contactor 50. Such second flange is smaller than and disposed directly below flange 51. Although FIGURES 3 and 4 show contactor 50 in its lower or working position, a comparison of the two will help explain what happens when crank 54 is employed to bring about downward movement of the contactor.

As will be apparent on reflection, downward movement of crank 54 when the contactor is in its upper or idling position will cause crank 54 to engage the upper edge of flange 57. At this stage, the latter is at a level higher than the level indicated in FIGURES 3 and 4. Thus on engagement by crank 54, a downward force is exerted on flange 57 and therefore on contactor 50. This causes the contactor to abandon its upper or idling position in favor of its lower or working position.

Movement between these two positions is possible as a result of the incorporation in contactor 50, along with a vertical slot 58, of a shoulder rivet or stepped sleeve 59 that is headed over into contact with, and thus rigidly mounted on, latch plate 34. Formed integrally with it is a broad collar 60: see FIGURE 4. Sleeve 59 itself is concentrically disposed in a suitable opening in a shallow boss 61 in latch plate 34. This assembly permits of the above-described pivotal movement of contactor 50, regardless of whether contactor 50 is in its upper or in its lower position.

The toggle spring 62 seen in FIGURE 3 influences the release mechanism to a degree but is provided primarily to return the contactor 50 in its undeflected upright or normal upper and lower positions: its ends are lodged in openings 63 and 64 in contactor 50 and latch plate 34, respectively.

Contactor 50 has a depending extension 65, seen in FIGURES 3, 5 and 7, at the lower end of which is a tab 66 that is turned inwardly at right angles to the plane of the contactor. Tab 66 is adapted to engage stop 46 on arm 44 of release lever 36 when, with release lever 36 in the position shown in FIGURE 3, contactor 50 is moved into its upper or idling position. After engagement has been established between stop 46 and tab 66, release lever 36, assisted by other elements to be described hereinafter, may be operated in a manner such as to cause it to move clockwise, seen as in FIGURE 3, thus forcing contactor 50 downward from its upper or idling position into its lower or working position. After this has been done, latch element 31 can be released by urging contactor 50 into the deflected position illustrated in FIGURE 5.

The lower part of contactor 50 is cut away at 67 to allow tab 45, arm 44 and release lever 36 an over-all range of pivotal movement corresponding approximately to the over-all length of slot 35 in latch plate 34. The shape of cut away portion 67 is such as to produce an end tang 68 adapted, so long as contactor 50 is in its lower or working position, to engage tab 45. Nevertheless, although tab 45 is in engagement with tang 68 except when contactor 50 is in its upper or idling position, tab 45 does not interfere with the arcuate movement of contactor 50; on the contrary, tab 45, arm 44 and release lever 36 are urged by tang 68 in a clockwise direction if and when contactor 50 is deflected by plunger 52. Actually, pivotal movement of contactor 50 comes to an end, in each of its two major positions, only when it engages an inturned tab 69 at the top of latch plate 34: see FIGURE 5.

Slot 35 and pin 33 limit both clockwise and counterclockwise movement of tab 45, arm 44 and release lever 36, whether induced by or in opposition to the tendency of coil spring 42 to return to a tension-free condition.

From FIGURE 5 and 7, it will be noted that contactor 50 has a lateral extension 70 at about the level of toggle spring 62. Extension 70 is provided with a slot 71 with inclined side walls 72 and 73 that permits contactor 50 to move in an arcuate locus as hereinabove described. It also provides guidance for the proximate end 74 of a laterally extending lever arm 75, one of the arms of a locking lever of the bell-crank type that is pivotally mounted on latch flange 40.

Locking lever 76 is present primarily for the purpose of moving contactor 50 between its lower and upper positions by actuation of the lever from an inside handle or garnish molding button coupled to the lever by a suitable connection (not shown).

As will be apparent from FIGURES 6 and 8, locking lever 76 is capable of movement between the two positions therein shown. Its upwardly directed arm 78 is always biased toward one or the other by a toggle spring 79; however, locking lever 76 is precluded from moving too far in a counterclockwise direction by the stop 80 at the upper end of latch flange 40. It is precluded from moving too far in a clockwise direction by a stop 81 on latch flange 40. Although locking lever 76 is generally L-shaped, it includes a depending integrally formed tab 82 that is required only under certain circumstances.

As upper arm 78 is moved to the right, seen as in FIGURE 8, tab 74 on laterally extending arm 75, which engages lower edge 73 of slot 71, can push down on lateral extension 70 of contactor 50, thus depressing the contactor as a whole. If, however, the contactor is already in its lower or working position, locking lever 76 may be employed to push it into its upper or idling position. This may be done by moving upper arm 78 counterclockwise, seen as in FIGURES 6 and 8, causing tab 74 on lateral arm 75 to exert an upward force on the upper edge 72 of slot 71. Locking lever 76 is essentially an adjunct to contactor 50 and is without any effect of its own on the action of latch element 31.

A remote control lever 83, likewise of the bell-crank type, is movably mounted somewhat below locking lever 76 on latch flange 40, to which it is held by a pivot pin 84. Its upwardly reaching arm 86 has a cut-away portion 85 that permits it to receive and cooperate with tab 82 on lower arm 75 of locking lever 76.

Similarly, a laterally extending arm 87 with an off-set end 88 permits remote control lever 83 to engage and lift the laterally extending arm 38 by which release lever 36 is guided in slot 39. Such engagement occurs when remote control 83 is moved in counterclockwise fashion from the position shown as in FIGURE 8. Release lever 36 is caused to move clockwise, producing attendant movement of latch element 31 and unlatching of the mechanism as a whole.

Downwardly directed arm 89 on remote control lever 83 may, if desired, be provided with a headed stud 90 such as is shown in FIGURES 4 and 8 to which can be coupled a slotted rod 92 that extends to an inside door handle (not shown). If pushed to the right, seen as in FIGURE 8, rod 92 may be employed to unlock and unlatch the mechanism as a whole by depressing contactor 50 from its upper or idling position, which is accomplished with the aid of laterally extending arms 87 and 38 on remote control lever 83 and release lever 36, respectively. Movement of remote control rod 92 in the opposite direction; i.e., from right to left, produces upward movement of contactor 50 through the action of upwardly directed arm 86 on tab 82 of locking lever 76. In both cases, downwardly directed arm 89 of remote control lever 83 is guided and limited in its movement by the coaction of an outwardly turned tab 93 with an arcuate slot 94 in latch flange 40: see FIGURE 8.

To preclude unlocking and unlatching of the mechanism as a whole by means of remote control rod 92, it is possible to block counterclockwise movement of remote control lever 83 by means of a child safety lever pivotally mounted on the pin 95: see FIGURES 6 and 8. A first arm extending to the right, designated 96, has a projecting portion 97 that extends through a two-position slot 98 in latch plate 34. When arm 96 is depressed as in FIGURES 6 and 8, an oppositely directed arm 99 (shown broken away in FIGURE 8 but seen in full in FIGURE 6) occupies a position such as to block movement of arm 89 on remote control lever 83. Access to the projecting portion 97 of arm 96 can be had only from the cleavage zone between the door 2 and body 1 of the automobile; consequently, a child toying with the handle at the end of remote control rod 92 cannot unlatch the mechanism and thus inadvertently open the door of the automobile.

Figure 19:
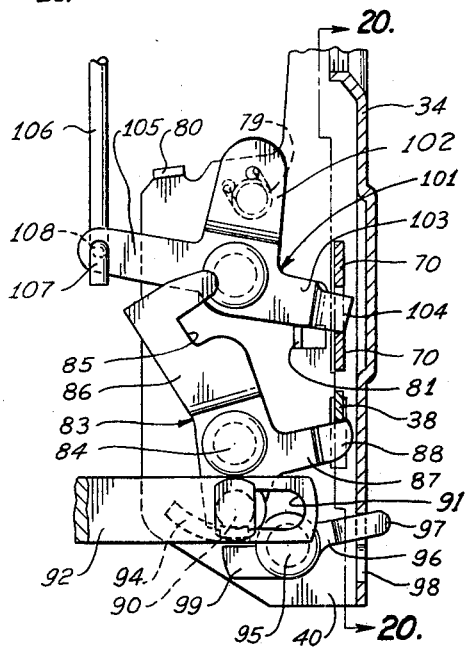
FIGURE 19 is a view comparable to those of FIGURES 4 and 8 illustrating how the latch mechanism may be modified to provide for the use therewith of an overlying garnish molding button (not shown)
Figure 20:
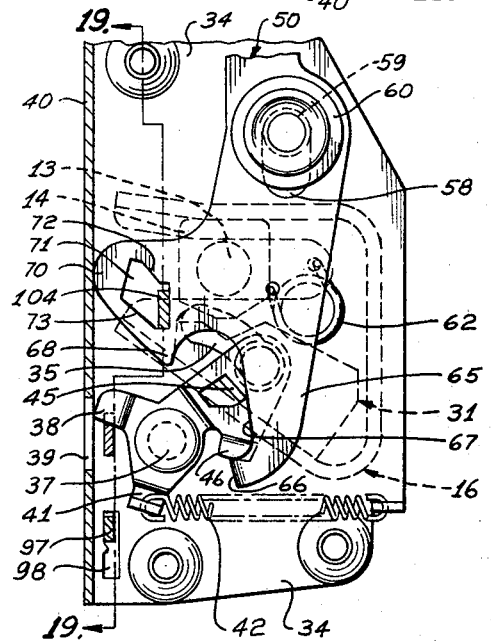
FIGURE 20 is a corresponding view showing the contactor and other parts seen as if from line 20—20 of FIGURE 19.

Shown in FIGURES 19 and 20 is a modification in which the upper of the two bell-crank levers on latch flange 40 is so formed as to facilitate actuation from a garnish molding button that can be located directly above. In this form of the invention, use is made of a T-shaped locking lever 101 of the bell-crank type. Such lever is formed with an upper arm 102, a first laterally directed arm 103 with an offset tab 104 at its end, and a second laterally directed arm 105 on the opposite side of the lever.

The rod 106 seen in FIGURE 19 is connected at its upper end to a garnish molding button (not shown). By means of an offset lower portion 107 at its lower end and a suitable opening in the outer end of laterally extending arm 105 it is connected as shown in FIGURE 19 to locking lever 101. A downward push on rod 106 tends to produce upward movement of the contactor 50 from the depressed position characterizing FIGURE 20; thereafter, an upward pull on rod 106 tends to depress the contactor and thus prepare the way for unlatching of the mechanism as a whole. In all other respects what appears in FIGURES 19 and 20 is substantially the same as what has already been described.

Figure 21:
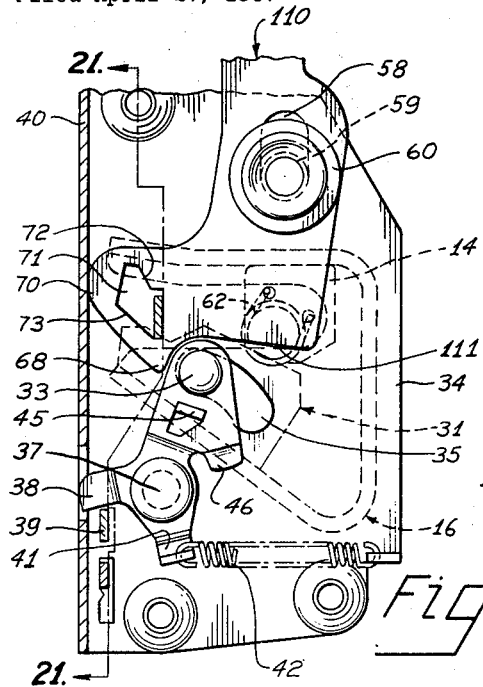
FIGURES 21 and 22, which are generally similar to those of FIGURES 19 and 20, show the latch mechanism as modified for use in the left rear door of an automobile.
Figure 22:
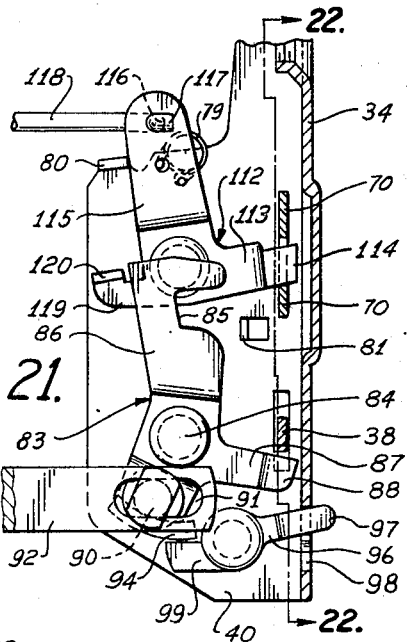

FIGURES 21 and 22 relate to a modification intended for use in the left-hand rear door of the same automobile. In this embodiment of the invention, the depending extension 65 of contactor 50 is omitted; instead, contactor 110 has a squared-off portion 111 at approximately the level of toggle spring 62. Locking lever 112, the upper of the two levers mounted on latch flange 40, has a laterally extending arm 113 with an offset end tab 114 for moving contactor 110 up and down as previously explained.

To upwardly reaching arm 115, which is provided with a suitable opening 116, may be connected the offset end 117 of a horizontally extending control rod 118 that may be coupled in suitable fashion to a remotely located garnish molding button (not shown). Rod 118 can impart clockwise and counterclockwise movement to upwardly reaching arm 115, to laterally directed arm 113, and to the oppositely extending laterally directed arm 119 appearing in FIGURE 21. On the latter is an inturned tab 120 that acts as a stop limiting counterclockwise movement of arm 86 of remote control lever 83.

From FIGURES 3, 20 and 22 it will be evident that in its reciprocatory movement the contactor is guided at all times by contact of lateral extension 70 with latch flange 40, toward which such extension is urged by toggle spring 62.

One of the advantages of the invention resides in the fact that the front door of the automobile, left or right as the case may be, may be closed, latched and locked without using a key unless the operator prefers to do so. Assuming the door to be open, keyless locking can be accomplished in two steps; namely, moving the garnish molding button or inside door handle into locking position and, while closing the door, depressing the button in the push button assembly as far as it will go. The button may be released when the door is flush with the body, by which time the full automatic locking has taken place.

Another advantage of the invention stems out of the fact that it provides means for restoring the locking lever to non-locking position in the event the locking lever is placed in locking position while the door is open: in such circumstances, the locking lever moves automatically into non-locking position, thus preventing the driver from locking himself outside.

A further feature of the invention resides in the child safety lever, which positively prevents door opening from within: when it is in use, the door can be opened only by taking two separate steps; viz., lifting the garnish molding button and depressing the outside push button.

Another important advantage of the invention resides in its unusual safety features. For example, except when resisting movement of release lever 36, coil spring 42 is free of tension, which means that no appreciable amount of energy is stored in spring 42 when the mechanism is in latched condition. Research has shown that energy stored in a spring which is under tension can be released by the impact of a collision, causing the door to open and the occupants of the automobile to be thrown out.

If as a result of a collision, a latched door opens, the chance of injury to the occupants of the automobile is greatly increased. It is for this reason that the remote control rod of the present invention must be pushed rather than pulled to lock the mechanism. Deformation of a remote control rod of the conventional type in an accident can have the same effect as releasing energy stored in a spring. This, however, does not hold in the case of the latch mechanism of the present invention, which is further characterized by unusual reliability, quietness in action and ease of operation.

It is intended that all features of patentable novelty residing in the invention shall be covered in the patent by summarization in the appended claims:

1. An automobile door latching mechanism comprising a latch plate; a latching wedge supported for translatory movement on one side of the latch plate; a one-piece contactor pivotally supported on the opposite side of the latch plate for sliding movement between a first or working position and a second or idling position in each of which the contactor can pivot laterally; means for maintaining the contactor temporarily in each of such first and second positions; and, on the same side of the latch plate as the contactor, a plurality of interconnected latch components one of which is an end-supported pin extending into the latching wedge through an opening in the latch plate, said plurality of interconnected latch components being so arranged that movement imposed on at least one of said plurality of components brings about a retreat of the latching wedge from its latched position.

2. A latching mechanism according to claim 1 wherein said plurality of interconnected latch components includes a lever pivotally mounted on the latch plate, said opening comprises a slot in the latch plate encompassing the unsupported end of the pin and a return spring connects the lever and the latch plate.

3. A latching mechanism according to claim 2 wherein said return spring, operating on said lever, biases the latching wedge toward latched position.

4. An automobile door latching mechanism incorporating a latch plate, an edge flange projecting from the inside face of the latch plate, and a latching wedge projecting from the outside face of the latch plate, said door latching mechanism being characterized by an elongated one-piece contactor pivotally supported on the inside face of the latch plate; an elongated slot in the contactor spanning its pivot axis and extending thence in a direction paralleling the longitudinal axis of the contactor; means for bringing about sliding movement of the contactor including a bell crank lever mounted on the edge flange; a plurality of interconnected latch components including means extending through an opening in the latch plate, one of said plurality of components being a bell crank lever mounted on the latch plate, so arranged that movement imposed on at least one of said plurality of components brings about responsive movement of said latching wedge through said last-mentioned means; and means for temporarily maintaining the contactor at each of the two extremes of its sliding movement.

5. An automobile door latching mechanism incorporating a latch plate, an edge flange projecting from the inside face of the latch plate, and a latching wedge projecting from the outside face of the latch plate, said door latching mechanism being characterized by an elongated one-piece contactor pivotally supported on the inside face of the latch plate; an elongated slot in the contactor spanning its pivot axis and extending thence in a direction paralleling the longitudinal axis of the contactor; means for bringing about sliding movement of the contactor including a plurality of bell crank levers mounted on the edge flange; a lever on the latch plate; an end-supported pin extending through an opening in the latch plate from the lever on the latch plate into the latching wedge; and spring means for temporarily maintaining the contactor at each of the two extremes of its sliding movement.

6. A latching mechanism according to claim 4 wherein the lever on the latch plate carries a stop adapted to engage the contactor when in its idling position and urge it thence into its working position.

7. A latching mechanism according to claim 4 wherein the lever on the latch plate carries a stop which, when the contactor is in working position, lies in the path of the pivotal movement of the proximate portion of the contactor.

8. A latching mechanism according to claim 5 wherein the opening in the latch plate through which the unsupported end of the pin extends, overlies an opening in the latching wedge receiving the unsupported end of the pin.

9. A latching mechanism according to claim 5 wherein the latching wedge takes the form of a two-stage wedge guided in its retreat by a housing in which it is contained.

10. A latching mechanism according to claim 5 wherein the first stage of the latching wedge has a portion producing early latching upon engagement by a striker and the second stage has a portion producing chocking engagement with such striker.

11. A latching mechanism according to claim 5 wherein at least one of the bell crank levers on the flange is adapted to impinge upon the lever on the latch plate.

12. A latching mechanism according to claim 5 wherein one of the arms of the bell crank lever on the latch plate is in the path of travel of one of the bell crank levers on the flange.

13. A latching mechanism according to claim 5 wherein the means for bringing about sliding movement of the contactor include a lever with a projecting portion that extends into a slot in the contactor.

14. A latching mechanism according to claim 13 wherein the means for bringing about sliding movement of the contactor include spaced flanges on the contactor positioned for engagement by a movable lock cylinder extension.

15. A latching mechanism according to claim 14 wherein a crank forming part of the lock cylinder extension projects into the space between said flanges.

References Cited
UNITED STATES PATENTS

| | | | |
|---|---|---|---|
| 2,274,362 | 2/1942 | Devereaux | 292—164 |
| 2,800,787 | 7/1957 | Jeavons | 292—280 X |
| 2,993,360 | 7/1961 | Craig | 70—264 |
| 3,081,117 | 3/1963 | McDaniel | 292—280 X |
| 3,111,339 | 11/1963 | Nadeau | 292—216 |
| 3,309,127 | 3/1967 | Pickles | 292—216 |
| 2,183,672 | 12/1939 | Devereaux | 292—302 X |
| 3,027,184 | 3/1962 | De Vito | 292—216 |
| 3,171,677 | 3/1965 | Klove, Jr. et al. | 292—216 |

RICHARD E. MOORE, Primary Examiner